United States Patent
Ravi et al.

(10) Patent No.: US 10,831,232 B2
(45) Date of Patent: Nov. 10, 2020

(54) COMPUTER ARCHITECTURE ALLOWING RECYCLING OF INSTRUCTION SLACK TIME

(71) Applicant: Wisconsin Alumni Research Foundation, Madison, WI (US)

(72) Inventors: Gokul Subramanian Ravi, Madison, WI (US); Mikko H. Lipasti, Lake Mills, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 96 days.

(21) Appl. No.: 16/276,744

(22) Filed: Feb. 15, 2019

(65) Prior Publication Data
US 2020/0264652 A1    Aug. 20, 2020

(51) Int. Cl.
*G06F 1/10* (2006.01)
*G06F 9/38* (2018.01)

(52) U.S. Cl.
CPC .............. *G06F 1/10* (2013.01); *G06F 9/3855* (2013.01)

(58) Field of Classification Search
CPC ................................. G06F 1/10; G06F 9/3855
See application file for complete search history.

(56) References Cited

U.S. PATENT DOCUMENTS

| | | | | |
|---|---|---|---|---|
| 5,884,060 A | * | 3/1999 | Vegesna | G06F 9/30112 712/215 |
| 2008/0229093 A1 | * | 9/2008 | Butts | G06F 15/16 713/100 |
| 2018/0088989 A1 | * | 3/2018 | Nield | G06F 9/5027 |

OTHER PUBLICATIONS

Gokul Subramanian Ravi, "Accelerating Approximate Programs via Aggressive Slack Recycling", Department of Electrical and Computer Engineering, University of Wisconsin Madison, dated Oct. 23, 2017—(35) pages.

* cited by examiner

*Primary Examiner* — Stefan Stoynov
(74) *Attorney, Agent, or Firm* — Boyle Fredrickson, S.C.

(57) ABSTRACT

A computer architecture suitable for out-of-order processors manages the problem of timing slack, in which an instruction completes before its clock cycle, by recycling that slack to allow the next succeeding instruction allowing that instruction to begin execution earlier. This recycling mechanism is enabled through the use of a transparent gating between execution units which allows data transfer before clock cycle boundaries and, in some cases, by aggressively issuing children instructions contemporaneously with their parent instruction after a grandparent instruction is issued.

17 Claims, 5 Drawing Sheets

COMPUTER ARCHITECTURE ALLOWING RECYCLING OF INSTRUCTION SLACK TIME

STATEMENT REGARDING FEDERALLY SPONSORED RESEARCH OR DEVELOPMENT

This invention was made with government support under 1615014 awarded by the National Science Foundation. The government has certain rights in the invention.

BACKGROUND OF THE INVENTION

The present invention relates to computer architectures, and in particular to an out-of-order processor or the like capturing the extra time after an instruction completes execution but before the end of the clock cycle (slack time) for use by the next instruction.

An important class of computer processors uses a synchronous architecture in which data transfer and execution occurs at boundaries between clock cycles. This synchronization is enforced by a clock timing signal propagated throughout the architecture and a set of transfer gates which allows communication of data only on clock cycle boundaries. Synchronous architecture helps eliminate "race" conditions where the operation of the processor can change non-deterministically depending on differences in the relative speeds of interrelated calculations (operations) and data transfers.

In a synchronous architecture, the clock cycle length is set to ensure that any given instruction will complete predictably before a given clock cycle boundary. The length of the clock cycle must be set conservatively because the amount of time required for an instruction to complete can vary significantly based on two sources of delay. The first source of delay variation results from changes in the operating conditions of the processor and a particular changes in its fabrication (process), operating voltage, or operating temperature (PVT delay). A second source of delay comes from variation between the complexity of the instructions and the length of their operands (instruction/operand delay). The relevant operand delay includes not only the predetermined width of the operand (precision) but also the run time number of leading zeros (spatial utilization).

Setting the clock cycle length to be sufficient to accommodate these variations results in a typical instruction completing before the end of the clock cycle causing "slack" time measured as the time between the completion of the instruction in the beginning of the next clock cycle. Slack time decreases the effective performance of the processor and can reduce its energy efficiency.

The prior art has address slack time in several ways. Slack resulting from PVT delay can be reduced by adjusting the clock speed based on post-manufacturing characterization of device variation and current measurements of voltage, or temperature. When such measurements suggest that the processing speed will be faster, the length of the clock cycle is decreased reducing slack.

Instruction/operand delay can be addressed through "timing speculation" which tracks the frequency of timing errors or attempts to predict the occurrence of critical (lengthy) instructions to adjust the clock frequency or voltage accordingly, boosting processor speed via voltage and temperature (VT) adjustments or changing the clock cycle length as needed. This approach is limited by the difficulty of predicting the occurrence of critical instructions and of adjusting clock speed or VT parameters at the timing granularity at which instruction criticality changes.

Slack resulting from instruction/operand delay may also be addressed by modifying the architecture with special circuitry to accelerate the most time consuming instructions (reducing the variation in instruction execution times) or by opportunistically matching pairs of instructions with high slack to be fit into a single clock cycle. Optimizing the instruction flow for this purpose is complex, and unoptimized code provides little opportunity for such combination.

Slack caused by data/operand delay has been increasing as a side effect of richer instruction sets which provide both more complex instructions having increased functionality but requiring additional time for execution as well as simpler instructions with intentionally reduced functionality requiring less time for execution. More complex instructions are driven by a desire to increase execution bandwidth per fetched instruction. Simpler instructions are driven by energy concerns and their suitability for specialized tasks such as image processing and machine learning. Slack is a function of the difference between these increasing extremes. An analysis by the present inventors has indicated that slack caused by instruction/operand delay can be as much as one half of the clock cycle length.

SUMMARY OF THE INVENTION

The present invention accommodates existing slack by recycling it for use with the next instruction. In this way, problems of adjusting clock cycle length, changing processor operating parameters, or adding new instruction execution paths are avoided.

Generally, the invention recycles slack by providing transfer gate "transparency" in between clock cycle boundaries allows a succeeding instruction to obtain its data early during what would otherwise be slack time. The benefit of this transfer gate transparency can be enhanced by issuance of multiple successive instructions to execution units on the same clock edge.

Specifically, in one embodiment, the invention provides a computer architecture having a clock for generating clock cycles for synchronizing operation of the computer architecture components and a set of execution units (EUs) operable in parallel to execute computer instructions. Transmission gates receive the clock signals and are each positioned to receive output of an EU for transmission to the input of other EUs. The transmission gates operate in a first mode to allow communication between a first and second EU only at boundaries between clock cycles and in the second mode to allow communication between the first and second EU between boundaries between clock cycles and switch from the first mode to the second mode on clock cycle boundaries. A scheduling circuit schedules instructions for execution on EUs according to data dependencies and each given transmission gate receives a mode signal switching the given transmission gate to the second state when a parent instruction is being executed on the corresponding first EU and will complete within a current clock cycle, wherein the instruction on the corresponding second EU is a child instruction dependent on the parent instruction for data.

It is thus a feature of at least one embodiment of the invention to provide early transmission of data between a provider EU and a consumer EU to allow processing by the consumer EU during what would otherwise be slack time of the producer EU.

The transmission gates may operate to allow communication between the first and second EU in the second mode for at least a majority of the duration of a clock cycle.

It is thus a feature of at least one embodiment of the invention to provide simplified control of the transmission gates by placing them in the second mode for all or most of the clock cycle and to eliminate the need for precise determination of the time of completion of the instruction being executed on the producer EU during that clock cycle.

The transmission gates may use a flip-flop, transferring data received at an input of the storage element to an output of the storage element at a clock boundary, and a switch operating in the second mode to bypass the storage element and transmit data received at the input of the storage element to the output of the storage element independent of clock boundaries.

It is thus a feature of at least one embodiment of the invention to provide compatibility with well-understood flip-flop transfer gates by adding a simple bypass switch.

Alternatively or in addition, the mode signal from the scheduling circuit may switch a transmission gate to the second state when a grandparent instruction is being executed and will complete within a current clock cycle, wherein the parent instruction is dependent on the grandparent instruction for data.

It is thus a feature of at least one embodiment of the invention to provide a simple trigger event (completion of a grandparent instruction) for the simultaneous issuance of data dependent instructions (parent and child instructions) based on a common dependency with the grandparent.

The computer architecture may further include set of instruction buffers such as Reservation Station Entries (e.g., RSEs) holding instructions prior to execution including a grandparent instruction, a parent instruction, and a child instruction where the child instruction is data dependent on the parent instruction and the parent instruction is data dependent on the grandparent instruction. A scheduling circuit may issue instructions received from the decoder to the EUs for execution and operate to issue the grandparent instruction in a first clock cycle and to issue both the parent and child instructions at a same later second clock cycle.

It is thus a feature of at least one embodiment of the invention to increase the opportunity for slack recycling by increasing overlap of availability in succeeding instructions that can receive the recycle slack.

The computer architecture may further include a decoder determining an instruction execution time for a given instruction being a time duration required for the instruction to complete after receiving its operands such as can provide a measure of slack indicating a difference between a length of the clock cycle and a time period within which the given instruction should complete.

It is thus a feature of at least one embodiment of the invention to provide an estimate of execution time that can be used to trigger transparency of the transfer gates when there is an opportunity for slack recycling while otherwise preserving synchronous data transfer to prevent race conditions.

The scheduling circuit may determine a completion instant (CI), based on the execution time from the decoder, for a parent instruction, and the computer architecture may operate to move the transmission gates connecting a first EU executing the parent instruction with a second EU executing a child instruction, data dependent on the parent instruction, based on an indication as to when the parent instruction will complete determined at least in part from the execution time of the parent instruction.

It is thus a feature of at least one embodiment of the invention to make use of execution time data to determine whether a parent instruction will complete within a given clock cycle for triggering transfer gate transparency.

In addition, the scheduling circuit may determine the CI to allocate instructions to ALUs for a single clock cycle or for two clock cycles dependent at least in part on the CI of the instruction and the instructions on which the instruction is data dependent.

It is thus a feature of at least one embodiment of the invention to permit flexible allocation of more than one cycle to a given EU for execution, increasing the opportunity for slack recycling that results in execution times crossing clock boundaries.

The decoder may determine execution time based at least in part on a lookup table linking instruction types to CI for that instruction type.

It is thus a feature of at least one embodiment of the invention to provide a simple way of estimating execution times early in the decoding process.

The instruction type accessing the lookup table may include at least one of opcode type and a data operand type.

It is thus a feature of at least one embodiment of the invention to accommodate changes in CI that are caused by different opcodes and changes in execution time that are caused by different operand types for the opcodes to provide more accurate execution time estimates.

Alternatively or in addition, the decoder may determine execution time based at least in part on a prediction of a spatial utilization of operand data to be executed by the instruction.

It is thus a feature of at least one embodiment of the invention to provide advanced estimates of execution time variations caused by spatial utilization as a simpler alternative to circuitry for measuring actual spatial utilization later in the computational process.

The decoder may adjust the execution time based on operating conditions of the computer architecture selected from the group consisting of process variations, operating voltage, and operating temperature.

It is thus a feature of at least one embodiment of the invention to provide additional precision in the calculation of slack time allowing for correction of PVT delay.

When the architecture provides a set of instruction buffers holding instructions prior to execution including corresponding grandparent instructions, parent instructions, and child instructions, the instructions may be linked to operand tags designating operands required for the instruction execution and may be linked to destination tags indicating completion of the operation of the instruction. A scheduling circuit may operate to receive speculative issue requests from child instructions based on a matching of operand tags of the child instruction to destination tags of corresponding grandparent instructions and to receive nonspeculative issue requests from child instructions based on a matching of operand tags of the child instructions to destination tags of parent instructions. In this case, the scheduling circuit may select among requests of different child instructions to prefer nonspeculative requests.

It is thus a feature of at least one embodiment of the invention to prefer issuance of nonspeculative instructions to ALUs to provide a greater certainty of efficient EU utilization.

When the instruction buffers hold corresponding grandparent, parent, and child instructions, the instruction buffers for child instructions may hold at least one operand tag designating a destination tag of a grandparent instruction and at least one operand tag designating a destination tag of a parent instruction.

It is thus a feature of at least one embodiment of the invention to provide a buffer structure that can track multiple levels of data dependency to efficiently issue child or parent and child instructions at the best times for data slack recycling.

In some embodiments, the instruction buffers for child instructions hold only a single destination tag of a single grandparent instruction and only a single parent tag of a single parent instruction.

It is thus a feature of at least one embodiment of the invention to greatly reduce the instruction buffer size by storing only the critical grandparent and parent instructions.

The computer architecture may further include a predictor predicting a last of four grandparent instructions and a last of two parent instructions that will complete prior to a child instruction, the scheduling circuit scheduling the child instruction for execution when the single destination tag of the single grandparent instruction and the single parent tag of the single parent instruction matches the last of the four grandparent instructions and last of the two parent instructions.

It is thus a feature of at least one embodiment of the invention to greatly reduce the bus structures necessary to communicate tags by predicting and transmitting only those tags with the latest completion times.

These particular objects and advantages may apply to only some embodiments falling within the claims and thus do not define the scope of the invention.

DETAILED DESCRIPTION OF THE PREFERRED EMBODIMENT

Figure 1:
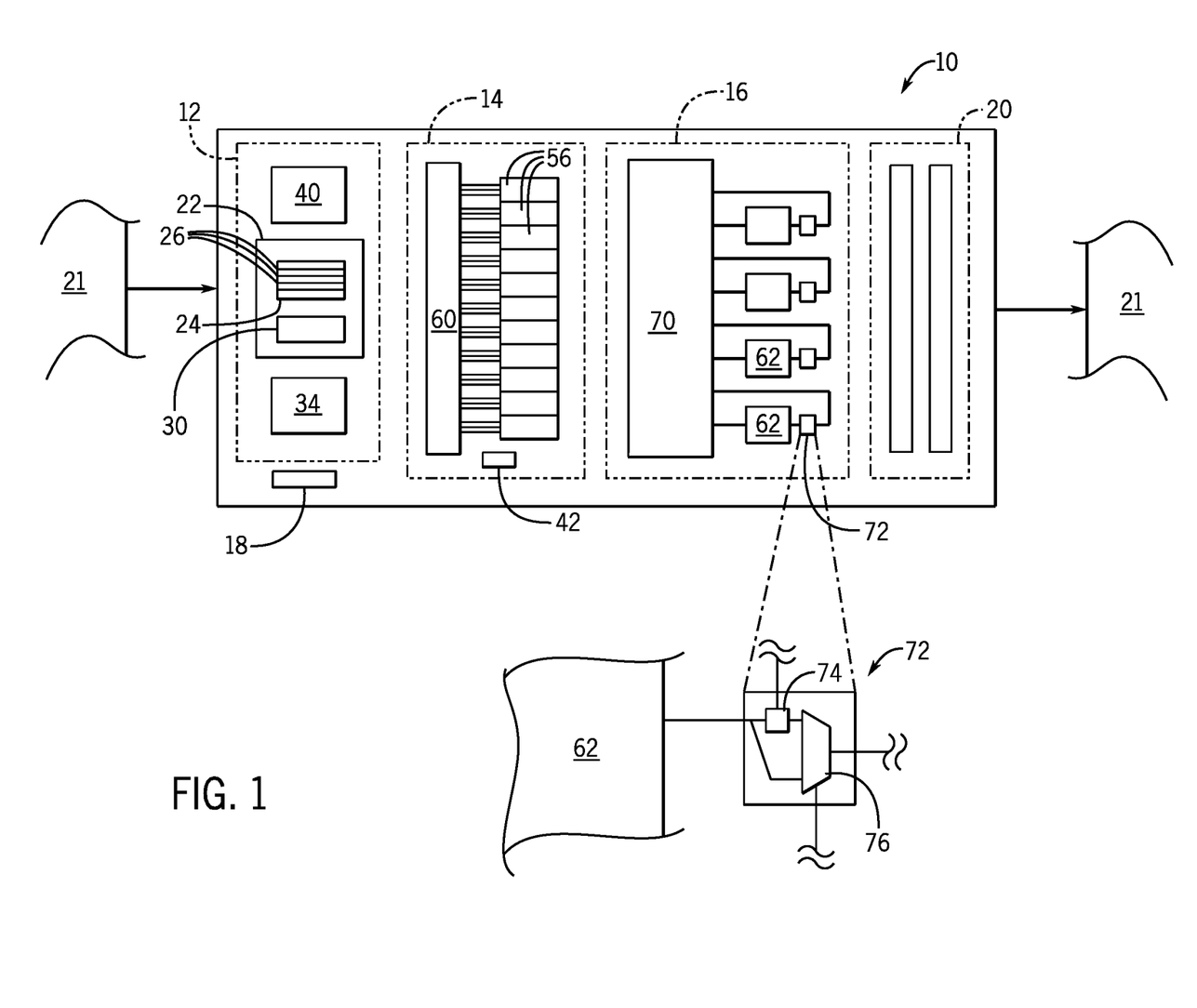
FIG. 1 is a simplified block diagram of an example out-of-order processor implementing the present invention and providing a decoding stage, a scheduling stage, and an execution stage having a set of execution units, and showing in inset a transfer gate structure controlling communication between execution units.

Referring now to FIG. 1, an out-of-order processor 10 suitable for use with the present invention may provide for an intercommunicating decoding stage 12, scheduling stage 14, and execution stage 16 each receiving a common clock signal from a clock generator 18. These elements may be constructed and operate according to well-known principles with specific modifications as discussed below. The out-of-order processor 10 will also include additional circuitry 20 including, for example, a reorder buffer, write back circuitry, etc. These latter elements are of conventional design and for this reason are shown only in outline and will not be described in more detail.

Generally, the out-of-order processor 10 may communicate with a memory 21 for the receipt of operands and instructions, the latter of which are provided to the decoding stage 12. The decoding stage 12 forwards decoded instructions to the scheduling stage 14. At the appropriate time, the scheduling stage 14 provides instructions to the execution stage 16 for processing where they are executed using the operands or the results from other executions. After processing, result data is provided to the additional circuitry 20 to be written back to the memory 21.

Figure 2:
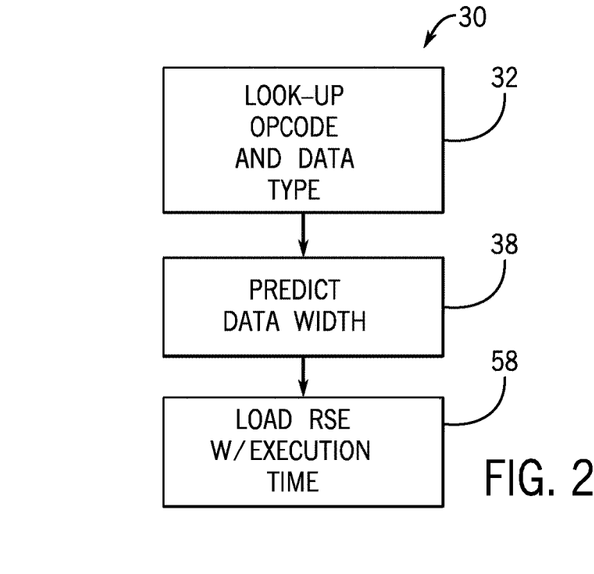
FIG. 2 is a flowchart of steps implemented by the decoding stage to determine the completion instant.

Referring now to FIGS. 1 and 2, the decoding stage 12 provides a decoding circuit 22 having a storage area 24 for receiving a set of instructions 26 during a fetch cycle. Decoding circuit 22 performs standard decoding of the instructions into micro-operations suitable for out-of-order execution by the execution stage 16. In addition, the decoding stage 12 is modified in the present invention to help characterize the slack of each instruction, by characterizing the instruction execution time (duration) according to a firmware program 30 together with a lookup table 34 and a predictor 40.

Figure 3A:
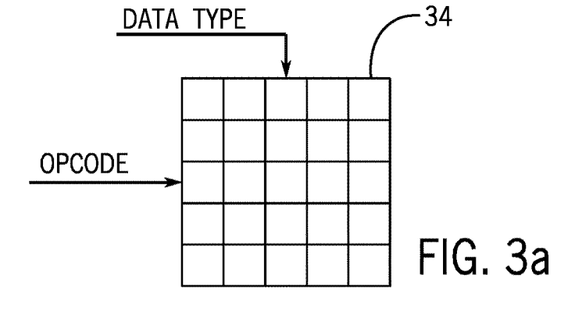
FIGS. 3a and 3b are logical diagram circuits used in the computation completion instants of FIG. 2.

Referring also to FIGS. 2 and 3a, at a first process block 32 of FIG. 2, lookup table 34 is indexed by the opcode of the instruction and by the data type of the operand of the opcode to obtain an execution time value 36 indicating a predicted execution time of the instruction. This execution time value 36 may be predetermined by empirical measurement of the execution units of the processor 10 or by simulation or may be dynamically determined by runtime profiling. In some embodiments, lookup table 34 may also be indexed with respect to manufacturing variation, voltage, and/or operating temperature of the processor 10 for more accurate assessments of execution time. Execution time values 36 adjusted for these operating conditions of the processor 10 may be determined empirically, by simulation, or by dynamic profiling. For the purpose of conserving storage space, the lookup table 34 may provide general categories of instructions, for example, distinguishing between arithmetic and logic instructions, for instructions having a shift component, and for different data widths.

Figure 3B:
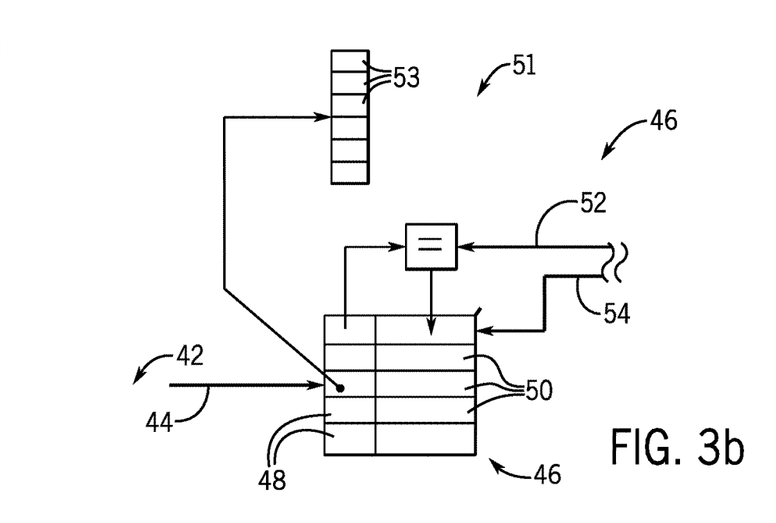

Referring to FIGS. 2 and 3b, at succeeding process block 38 of FIG. 2, the decoding circuit 22 may make a prediction about the spatial utilization of the operand data of the instruction using predictor 40. Spatial utilization is the functional width of the operand data. For example, in one case, spatial utilization may be the designated width of the operand data associated with the instruction minus leading zeros of the actual operand data. Other more aggressive characterizations of spatial utilization may be used reducing the precision or range of the operand data. In one embodiment, the predictor 40 receives a value of the program counter 44 (for example, implemented by the scheduling stage 14) to index a counter array 46 having k-bit counters 50 linked to operand spatial utilization value 48 of the spatial utilization of the previous operand associated with the instruction of that program counter value. Each of the counters 50 accumulates the number of consecutive times that the spatial utilization of the operand of the instruction has been repeated. If the counter value is less than its maximum ($2k-1$), the predictor 40 predicts the conservative value that the spatial utilization is a maximum value of the operand for that instruction. Otherwise, the predictor 40 predicts the most recent repeated spatial utilization value.

The values of the counters 50 are updated at a time of execution of the instruction (when the actual spatial utilization can be determined) using the measured spatial utilization 52. Preferably the measured spatial utilization 52 and the operand spatial utilization values 48 are quantized, for example, into four categories between high and low spatial utilization to reduce the size of the predictor 40. A current program counter value 54 for the instruction associated with this measured spatial utilization 52 indexes the counter array 46 to increment the correct counter 50 only if the measured spatial utilization 52 matches the last stored data spatial utilization value 48. If there is no match, the last stored spatial utilization value 48 is set equal to the measured spatial utilization 52 and the counter is 50 reset. Circuitry that can be repurposed for this prediction is described in G. H. Loh, "Exploiting data-with locality to increase superscalar execution bandwidth," ser. MICRO, 2002.

The predicted spatial utilization value 48 associated with the program counter 44 is used to index a second lookup table 51 having execution times adders 53 associated with that spatial utilization. As with the lookup table 34, the second lookup table 51 may also be indexed with respect to manufacturing variation, voltage, and/or operating temperature of the processor 10 for more accurate assessments of execution time. As an alternative to storing multiple values in table 34 and predictor 40 for various operating parameters of the processor 10 (e.g., PVT), single values may be recalibrated periodically according to manufacturing variation, voltage, and temperature operating conditions of the processor 10 monitored dynamically using profiling implementing hardware timers and counters.

While there are advantages to predicting spatial utilization as described, the invention also contemplates the alternative that this spatial utilization data may be determined immediately prior to execution when the actual operand data is available and spatial utilization can be assessed with an appropriate gate array counting leading zeros.

Referring to FIGS. 1 and 2, predicted instruction execution time combining the execution time value 36 obtained from table 34 and the execution time adder 53 obtained from predictor 40 may then be provided to the scheduling stage 14, as indicated by process block 58, where this data is added to reservation station entry (RSE) 56 associated each decoded instruction as will be used for instruction scheduling.

The decoding stage 12 may also determine whether the given instruction will benefit from slack recycling. Certain instructions such as multi-cycle instructions, floating-point instructions, and memory operations may be excluded from slack recycling by the decoding stage 12 (for example, by additional entries in table 34) and revert to synchronous operation. This step is optional, however, and the present inventors contemplate that this approach can be used for multi-cycle instructions.

Referring again to FIG. 1, the scheduling stage 14 will provide a set of instruction buffers holding instructions and information about those instructions necessary for scheduling them. Generally the scheduling stage 14 uses a reservation station-based model for scheduling. These buffers can provide reservation station entries (RSEs 56), analogous to those normally used in out-of-order processing. Generally the RSEs 56 will identify or be linked to a particular instruction and the necessary operands needed by the instruction. In the present invention, the RSE also holds the execution time determined by the decoding stage 12 described above and a calculated completion instant as will be discussed in more detail below. Using this information, scheduling circuit 60 schedules the instructions of the RSEs 56 for executing in the execution stage 16

The execution stage 16 in a similar manner to conventional out-of-order processor provides a set of execution units (EU) 62 that can operate in parallel. Each EU may, for example, be an arithmetic logic unit (ALU) capable of executing computer opcodes such as arithmetic and logical instructions. Generally the EUs 62 may be any functional unit including but not limited to those which execute single cycle instructions, multi-cycle instructions, and floating-point instructions. Together the EU's 62 will have functionality to execute the entire instruction set architecture of the processor 10. The EU 62 can receive instructions and data from the scheduling stage 14 and are interconnected so that results calculated by one EU 62 may be provided as operands to another EU 62 as controlled by interconnection circuitry 70, for example, being a crossbar switch In the present invention, the timing of the transfer of data between EU 62 through the interconnection circuitry 70 is controlled by a bypassable transmission gate 72 on the output of each EU 62. In one embodiment, the bypassable transmission gate 72 provides an array of conventional D flip-flops 74 (equal in number to the width of the result data from the EU 62) receiving the result data at the data (D) inputs and being clocked in parallel by rising edges of the clock generator 18. The present invention modifies a conventional transmission gate employing flip-flop 74 by providing a corresponding set of multiplexers 76 that may select between the D inputs of the flip-flops 74 and the Q outputs of the flip-flops 74, essentially providing a controllable switch operating in a first mode to simply pass along the Q outputs of the flip-flops 74 and in a second mode bypassing the flip-flops 74 to provide the output of the EU 62 directly to the interconnection circuitry 70. These two modes of operation of the bypassable transmission gate 72, implemented by a control line in parallel to the multiplexers 76 permits slack time recycling.

Before providing additional detail about the operation of the scheduling stage 14, it is helpful to have an example of the scheduling process as implements slack time recycling.

Figure 4:
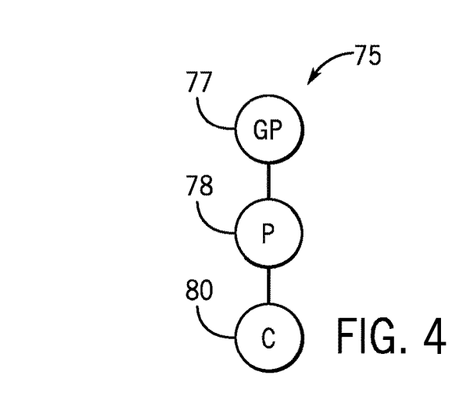
FIG. 4 is a data flow representation of three instructions of a program providing grandparent, parent, and child data dependencies.

Referring now to FIG. 4, an example code snippet 75 suitable for slack time recycling may have a grandparent instruction 77, a parent instruction 78, and the child instruction 80. It is assumed in this example that the parent instruction 78 is data dependent on the grandparent instruction 77, that is, the parent instruction 78 requiring the output of the grandparent instruction as its operands and thus necessarily executing after the grandparent instruction as determined by the scheduling stage 14 according to conventional techniques. Likewise, the child instruction 80 is assumed to be data dependent on the parent instruction 78.

The processing of this code snippet 75 will now be discussed with respect to a conventional out-of-order processing system (FIG. 5a) and a first and second version of the present invention (FIG. 5b and FIG. 5c) which are time-aligned for ease of comparison. In this regard, the timing of the processing in each example is based on a clock signal 82 from the clock generator 18 of FIG. 1 which defines a set of clock frames 84 labeled with Roman numerals and describing synchronous and corresponding execution frames 88 for each EU 62. Execution frames 88 for three EUs 62a-62c are shown; however, it will be understood that EU 62a and 62c may be the same EU in a two EU system or that additional execution units may be added.

Figure 5A:
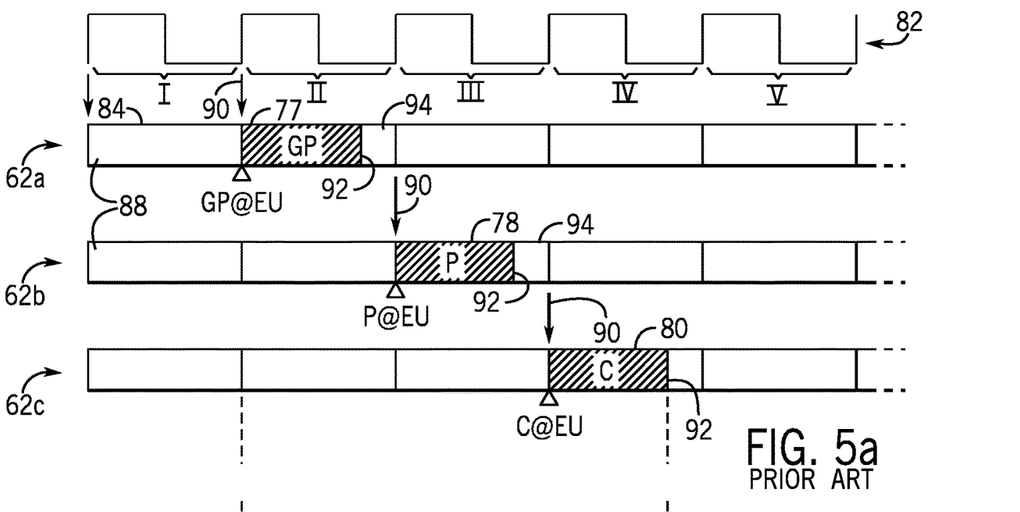
FIGS. 5a-c are timing diagrams showing: prior art execution of the instructions of FIG. 4, a first mode of execution of instructions of FIG. 4 according to the present invention, and a second mode of execution of instructions of FIG. 4 according to the present invention.

Referring to FIG. 5a, in a prior art execution of the program of FIG. 4, a scheduling stage may issue the grandparent instruction to arrive at EU 62a at the beginning of execution frame II at the same time it receives its operand data at boundary-constrained transmission interval 90 at the beginning of execution frame II. The narrow boundary-constrained transmission interval 90 represents a typical synchronous transmission of data in a prior art architecture which occurs only at execution frame boundaries at the rising edge of the clock signal 82 clocking the transmission gate flip-flops.

The grandparent instruction 77 executes during an interval indicated by the crosshatching to complete at a completion instant 92 resulting in slack time 94 before the end of the execution frame II.

The data of the grandparent instruction 77 is transmitted to the parent instruction 78 executing on EU 62b at the beginning of the third execution frame III after passage of the slack time 94. The parent instruction 78 was issued by the scheduling stage to arrive at the EU 62a at the beginning of execution frame II but waits to execute until execution frame III when its operand data arrives at the boundary-constrained transmission interval 90 according to synchronous operation.

The parent instruction 78 may also complete before the conclusion of execution frame III at completion instant 92 to provide slack time 94 during that execution frame III.

At the beginning of execution frame IV, the output of the parent instruction 78 is passed to the child instruction 80 at boundary-constrained transmission interval 90 so that the child instruction 80, which may then begin executing, ultimately completes sometime within execution frame IV. The child instruction 80 is issued to arrive at the EU 62c at the beginning of execution frame III but cannot begin executing until execution frame IV based on the synchronous transmission of operand data.

Figure 5B:
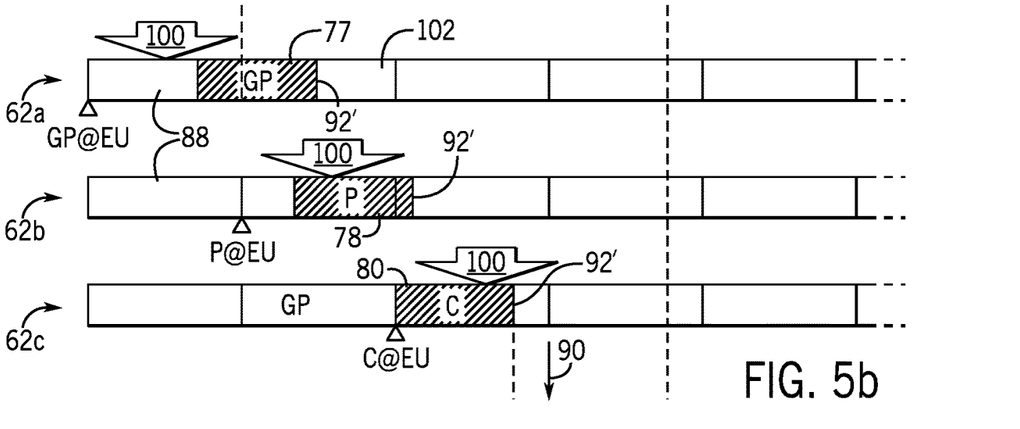

Referring now to FIG. 5b, in a first embodiment of the present invention, the bypassable transmission gate 72 discussed above with respect to FIG. 1 is used which allows data to be forwarded between EUs 62 over intra-boundary transmission interval 100 extending substantially the entire duration of the execution frames 88 between boundaries of the execution frames 88. This intra-boundary transmission interval 100 may be distinguished from the operation of flip-flops 74 to the extent that it is controlled by the level of the signal received by the multiplexers 76 and thus can remain on for an arbitrary length of time according to that signal level. This is in contrast to the flip-flops 74 which are edge triggered and are not level sensitive but provide for a short, practically fixed transfer of input data to the output of the flip-flops 74.

In this embodiment, the grandparent instruction 77 may again be issued so that it arrives at EU 62a at the beginning of execution frame I but may begin executing during execution frame I by means of transparent transmission of its operand data during intra-boundary transmission interval 100 from an earlier instruction (not shown). As a result, the grandparent instruction 77 begins executing before the beginning of execution frame II to complete at completion instant 92' of execution frame II before the completion instant 92 of the example of FIG. 5a. This creates increased slack time 102, but this slack time is recycled by providing operand transmission during intra-boundary transmission interval 100 of execution interval II to the parent instruction 78 which may then begin the start execution in execution frame II rather than waiting until execution frame III. This process is continued with parent instruction 78 completing at the beginning of execution frame III and through intra-boundary transmission interval 100 allowing the child instruction 80 to begin in execution frame III and complete in execution frame III as opposed to execution frame IV as shown in FIG. 5a. At the end of execution frame III, the data transmission may revert to normal synchronous operation transmitting data only at boundary-constrained transmission interval 90, for example, for store instruction, or the data transmission may remain as an intra-boundary transmission interval 100 at yet another EU 62. Note that in this case, the parent instruction 78 may cross a boundary between execution frames 88, and for this purpose, the invention can allocate to an EU 62 two clock cycles for execution of a given instruction using special flag bits contained in the RSE 56 as will be discussed.

Generally the scheduling stage 14 can only control the issuance and not the arrival of an instruction at EU 62 (which may be delayed by lack of available EUs); however, any delay in allocating an instruction to an EU 62 is acceptable to the extent that it indicates that all of the EU 62 are fully occupied and the invention's goal of high utilization is being met.

Figure 5C:
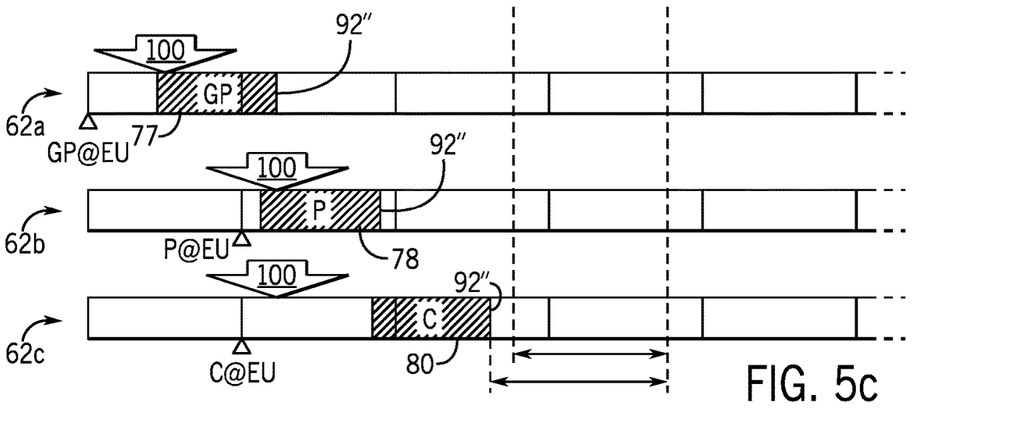

Referring now to FIG. 5c, the transparent data flow of FIG. 5b can be augmented with early (eager) issuance of the child operations based on issuance of the grandparent instruction 77. This approach is speculative in that even when a grandparent instruction 77 has issued, there is no certainty that the parent instruction 78 be available at an EU 62 in the following cycle. Nevertheless, the present inventors have determined that for common computational tasks, a parent instruction 78 and child instruction 80 can be reliably issued to take advantage of data transparency upon issuance of the grandparent instruction 77.

In this example, the grandparent instruction 77 issues and executes as discussed with respect to FIG. 5b; however, as triggered by the issuance of the grandparent instruction 77 at the beginning of execution frame I, at the beginning of execution frame II both the parent instruction 78 and child instruction 80 are also issued.

In this example, the parent instruction 78 begins execution and completes execution within the execution frame II at completion instant 92". The earlier issuance of the child instruction 80 allows the child instruction 80 to begin execution in execution frame II and thus to recycle slack in execution frame II from the grandparent instruction 77 and parent instruction 78 both. Generally this approach will allow completion of this child instruction 80 even earlier than the example of FIG. 5b.

Generally the processes of FIGS. 5a and 5b may be chained so that children instructions also act like grandparent instructions to other later parent and child instructions. Accordingly, even though the benefit of advancing the execution of instructions is only obtained if the chain of instructions advances a full clock cycle before it is necessary to revert to synchronous operand communication, the potential for obtaining a full clock cycle is high because of the ability to accumulate slack time from a relatively long chain of instructions.

The ability to start instructions as soon as their operand data is available rather than on the clock boundaries (using transparent data flow during the execution frames 88) requires that the completion instant of each instruction is known so that intra-boundary transmission interval 100 can be activated when a parent instruction completes and deactivated at other times to provide synchronous operation reducing race conditions. In this regard, the invention operates so that if an instruction is estimated to complete during an execution frame 88, the intra-boundary transmission interval 100 is activated to communicate the results of that instruction execution to an EU 62 holding the next instruction. Otherwise the intra-boundary transmission interval 100 is deactivated in favor of the boundary-constrained transmission interval 90.

Figure 6:
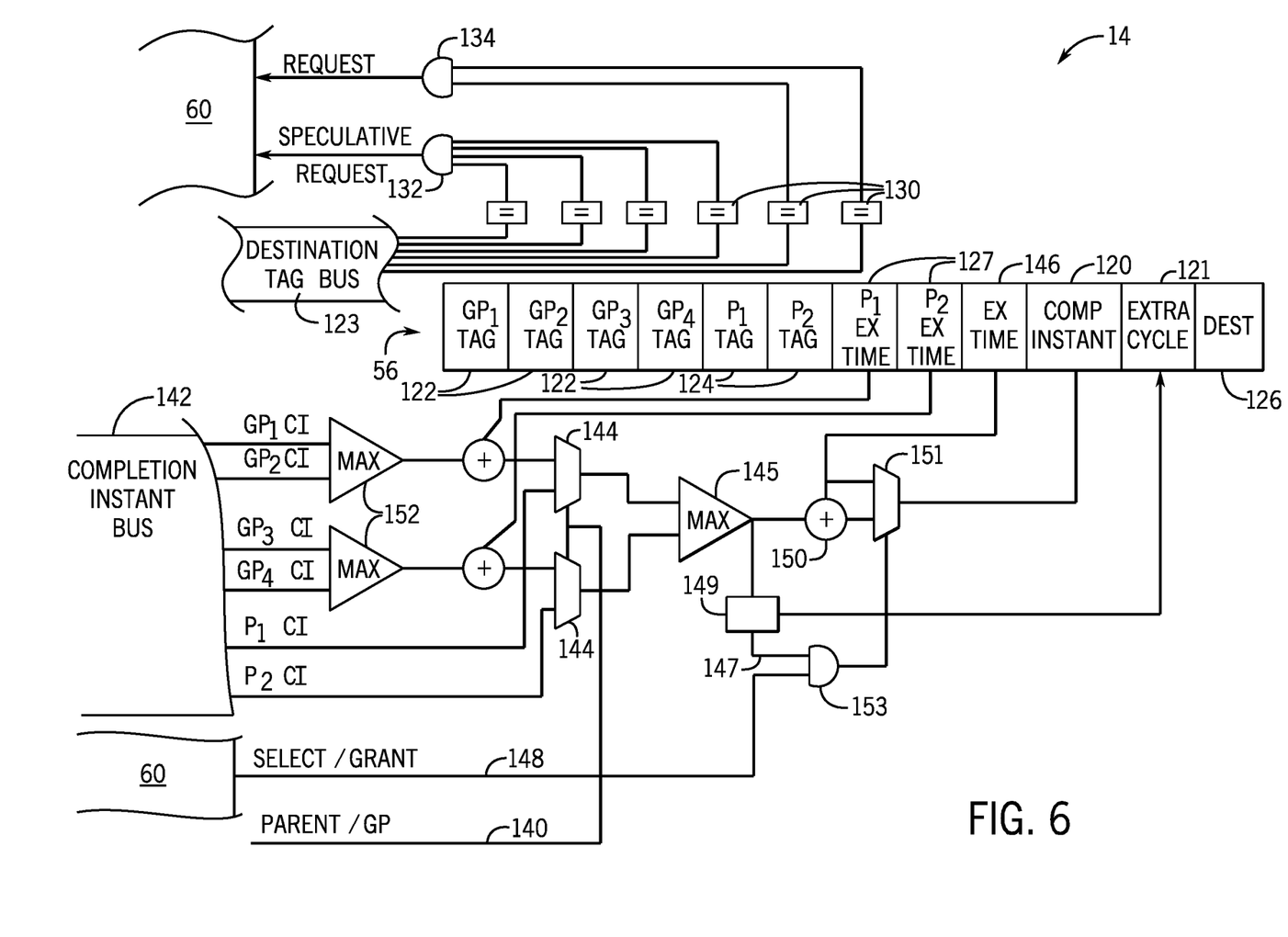
FIG. 6 is a logical diagram of the scheduling stage of FIG. 1 showing one RSE entry.

Referring now to FIG. 6, the process of controlling transparent data flow and establishing the completion instant of each instruction makes use of an extended RSE 56 in the scheduling stage 14. Only a single RSE 56 is shown; however, it is understood that the describe circuitry associated with this RSE 56 will be duplicated for each RSE 56.

Importantly, each RSE 56 provides information necessary to compute an estimated completion instant (CI) 120 of a given instruction used for controlling the operand transmission timing for the results of the given instruction as described above. The CI 120 is also used to control the transmission of a destination tag 126 of the RSE 56 to other instructions dependent on the given instruction. In this regard, the scheduling circuit 60 monitors the CI 120 of each instruction against a real-time clock and sets the destination tag 126 only after completion has occurred. Setting of the destination tag 126 causes a broadcasting of that destination tag on the destination register to inform other dependent processes.

The CI 120 is based on the CI 120 of the parent and grandparent instructions as will be discussed. To provide compact data storage, completion instant (CI) 120 may be quantized at ⅛ of the period of the clock signal 82.2.

For the purpose of computing the CI 120 for a child instruction 80, the RSE 56 for that instruction provides operand destination tags 122 for four grandparent instructions 77 and operand destination tags 124 for two parent instructions 78 indicating completion of those instructions. Two grandparent instructions 77 provide operands for each of the two parent instruction 78 which each provide two operands to the current child instruction 80 under the assumption of simple two-operand instruction. The value of these destination tags 122 and 124 is determined by the scheduling stage 14 according to dependency checking circuitry known in the art. Example dependency analysis circuitry is described, for example, in J. Stark, M. D. Brown et al., "On pipelining dynamic instruction scheduling logic," ser. MICRO, 2000.

Corresponding tags are received from the parent instructions 78 and grandparent instruction 77 over a destination tag bus 123 when those instructions are complete. When these broadcast tags for the grandparent instructions 78 match either all of the corresponding operand destination tags 122 (as determined by equality comparators 130 and AND gate 132) then a speculative request for issuance of the instruction of the RSE 56 is sent to the scheduling circuit 60. This request is speculative for the reasons discussed above and will be treated by the scheduling circuit 60 differently than a nonspeculative request.

Likewise when the broadcast tags from the destination tag bus 123 match all of the parent tags 124, match tags (determined by equality comparators 130 an AND gate 134) send a nonspeculative request to the scheduling circuit 60.

Upon receipt of requests from an RSE 56, the scheduling circuit 60 operates to issue the instruction associated with the requesting RSE 56 according to conventional scheduling algorithms generally observing an oldest first priority mechanism, but within this priority, the scheduling circuit 60 operates to give preference to nonspeculative requests over speculative requests. This approach of preferring nonspeculative requests reduces the potential for mis-speculation on the parent and the possibility of allocating a child instruction when there is in fact no slack to be utilized.

Contemporaneously with the generation of requests, the completion instant 120 for the RSE 56 is computed. A completion instant bus 142 communicates the completion instant of grandparent instructions 77 and parent instructions 78. This data is used to develop a parent/grandparent signal 140 indicating whether the child instruction 80 is being issued speculatively based on the grandparent instruction 77 or non-speculatively based on preceding parent instruction 78. In the former case, completion times will be received from grandparent instructions 77 and parent instruction 78 while in the latter case completion times will be received only from parent instructions.

In case of a parent-based wake up of the child instruction 80 of RSE 56, the estimated completion instant of each parent instruction 78 ($P_1CI$ and $P_2CI$), received over completion instant bus 142 from other RSEs 56, is selected by multiplexers 144 (controlled by the parent/grandparent signal 140) and the maximum of these two completion instants of the parent instructions 78 is selected by a comparator 145.

If this completion instant of the parent instruction 78 as calculated is within the current clock cycle (plus some slack threshold to be described) per threshold circuit 149, the child instruction 80 of the RSE 56 can issue and an issue signal 147 is provided to an AND gate 153. This AND gate 153 checks to make sure that the scheduling circuit 60 has granted the request of the instruction and that slack recycling is selected per select/grant line 148 from the scheduling circuit 60. If so, the AND gate 153 permits calculation of the completion instant 120. Generally the select/grant line 148 prevents slack recycling for instructions which will not benefit as determined by the decoding stage 14.

Once the child instruction 80 of the RSE 56 is ready to issue, its completion instant 120 can be calculated by summing the maximum parent completion instant ($P_1CI$ and $P_2CI$) with the execution time 146 of the current instruction (previously computed at process block 58 of FIG. 2 by the decoding stage 12). This completion instant 120 is then received by a multiplexer 151 and provided to a storage location for the completion instant 120 for the instruction of the RSE 56 if the instruction is ready to issue per the output of the AND gate. Otherwise, if the instruction has not been given, a grant by the scheduling circuit 60 or slack recycling is turned off, or if there is not sufficient amount of slack in the current clock cycle determined by the threshold circuit 149, the completion instant simply becomes the execution time 146 of the current instruction executing by normal synchronous operand transmission starting at the boundary of the next execution frame 88.

The threshold circuit 149 may determine that the parent instruction will execute in the next execution frame 88. In this case the issue signal 147 is again generated and the completion instant 120 is calculated from the maximum completion instants of the parents. In addition, an extra cycle flag 121 is set indicating to the scheduling circuit 60 that the execution unit 62 is allotted to execution frames 88 for that instruction.

Referring still to FIG. 6, in the case of a grandparent-based wake up, the maximum completion interval of each pair of grandparent instructions 77 ($GP_1CI$, $GP_2CI$ and $GP_3CI$, $GP_4CI$) are selected per comparators 152 and then added to the respective execution time 127 of the corresponding parent instructions 78 per summing junctions 154. These sums are then provided to the multiplexers 144 to use in lieu of the parent completion instants ($P_1CI$ and $P_2CI$)

which will not yet be available. The execution time 127 of the parents may be added to the maximum of these grandparent completion instants per comparator 145 to be processed as described above ultimately producing a completion instant 120 RSE 56 at the time of its loading by the scheduling circuit 60.

The threshold value used by the threshold circuit 149 may be set to ensure a minimum slack is available in a given execution frame 88 before slack recycling is attempted. This minimum slack implements a balance between slack recycling and excessive utilization caused by the ability of the scheduling circuit 60 to allocate multiple cycles to a given EU to allow instructions to cross clock boundaries. A higher threshold recycles slack more aggressively, starting consuming instructions earlier in the producer's completion cycle even when there is low slack. This can be beneficial if there are enough slack increments to cross the clock boundary. This value may be set empirically or can be implemented dynamically by monitoring EU utilization.

Figure 7:
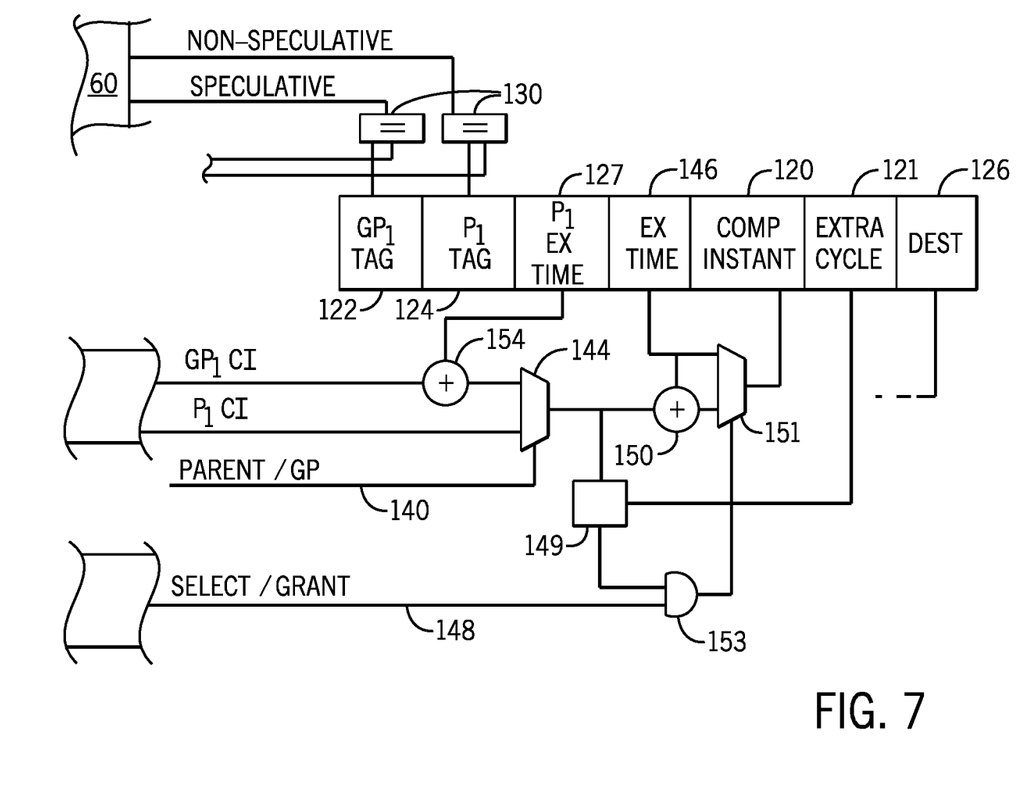
FIG. 7 is a figure similar to FIG. 6 showing an alternative RSE structure providing reduced interconnection complexity.

Referring now to FIG. 7, the size of the destination tag bus 123 and completion instant bus 142 needed to transmit the tags for the grandparent instructions 77 and parent instructions 78 as well as the size of the RSE 56 can be reduced by speculating as to which of the grandparent completion instants ($GP_1CI$, $GP_2CI$, $GP_3C$, $GP_4CI$) or parent completion instants ($P_1CI$ and $P_2CI$) will be later and sending only that completion instant. Predicting the last arriving source operand may be done, for example, as described by techniques known in the art for other purposes, for example, as described at D. Ernst and T. Austin, "Efficient dynamic scheduling through tag elimination," ser. ISCA, 2002.

Using this approach, the RSE 56 requires only a single grandparent tag, an operand destination 122 tag, and a single parent operand destination tag 124. Otherwise, the process of generating speculative or nonspeculative requests and calculating the completion instant 120 and determining the state of the extra cycle flag 121 are analogous to those of FIG. 6 with similar components given similar numbers.

Generally it should be understood that the labels "grandparent," "parent," and "child" refer to relative data dependencies, and a given instruction may at different times or in different contexts be any of a grandparent, parent, or child.

Certain operations of the invention which are speculative may employ miss speculation recovery techniques generally known in the art for example in which the instructions are executed without operand transmission transparency.

While D type flip-flops are described herein, the term flip-flop should generally be understood to include any clock to storage element providing comparable function of passing data from an input to output and storing that data at the output on a lock edge.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference, which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. A computer architecture comprising:
a clock for generating clock cycles for synchronizing operation of the computer architecture components;
a set of execution units (EUs) operating in parallel to execute computer instructions; and
transmission gates receiving the clock cycles and each positioned to receive an output of an EU for transmission to an input of another EU, each given a transmission gate operating in a first mode to allow communication between a corresponding first and second EU only at boundaries between clock cycles and in the second mode to allow communication between the first and second EU between boundaries of clock cycles and switch from the first mode to the second mode on clock cycle boundaries; and
a scheduling circuit scheduling instructions for execution on EUs according to data dependencies and wherein each given transmission gate receives a mode signal switching the given transmission gate to the second mode when a parent instruction is being executed on the corresponding first EU and will complete within a current clock cycle, wherein the instruction on the corresponding second EU is a child instruction dependent on the parent instruction for data.

2. The computer architecture of claim 1 wherein each given transmission gate operates to allow communication between the corresponding first and second EU in the second mode for at least a majority of a duration of a clock cycle.

3. The computer architecture of claim 1 wherein the transmission gates each comprise a flip-flop transferring data received at an input of the transmission gate to an output of the transition gate at a clock boundary and a switch operating in the second mode to bypass the flip-flop and transmit data received at the input of the transmission gate to the output of the transmission gate independent of clock boundaries.

4. The computer architecture of claim 1 wherein the mode signal from the scheduling circuit further switches the given transmission gate to the second state when a grandparent instruction is being executed and will complete within the current clock cycle, wherein the parent instruction is dependent on the grandparent instruction for data.

5. The computer architecture of claim 1 further including set of instruction buffers holding instructions prior to execution including a grandparent instruction, parent instruction, and a child instruction where the child instruction is data dependent on the parent instruction and the parent instruction is data dependent on the grandparent instruction; and the scheduling circuit operating to issue the grandparent instruction to an EU in a first clock cycle and to issue both the parent and child instruction to EUs at a same later second clock cycle.

6. The computer architecture of claim 1 further including a decoder determining an instruction execution time for a given instruction being a time required for the instruction to complete after receiving its operands such as can provide a measure of slack indicating a difference between a length of the clock cycle and a time period within which the given instruction should complete.

7. The computer architecture of claim 6 wherein the scheduling circuit determines a b completion instant (CI), based on the execution time from the decoder, for a parent instruction and wherein the computer architecture moves the transmission gates connecting a first EU executing the parent instruction with a second EU executing the child instruction, data dependent on the parent instruction, based on an indication as to when the parent instruction will complete determined at least in part from the CI of the parent instruction.

8. The computer architecture of claim 7 wherein the scheduling circuit determining the CI allocates instructions to EUs for a single clock cycle or for two clock cycles dependent at least in part on the CI of the instruction and instructions on which the instruction is data dependent.

9. The computer architecture of claim 6 wherein the decoder determines the execution time based at least in part on a lookup table linking instruction types to execution time for that instruction type.

10. The computer architecture of claim 6 wherein the instruction type includes at least one of opcode type and a data operand type.

11. The computer architecture of claim 6 wherein the decoder determines the execution time based at least in part on a prediction of a spatial utilization of operand data to be executed by the instruction.

12. The computer architecture of claim 6 wherein the decoder adjusts an execution time based on operating conditions of the computer architecture selected from the group consisting of manufacturing variation, operating voltage, and operating temperature.

13. The computer architecture of claim 1 further including a set of instruction buffers holding instructions prior to execution including corresponding grandparent instructions, parent instructions, and child instructions where a given child instruction is data dependent on a corresponding given parent instruction and a given parent instruction is data dependent on a corresponding given grandparent instruction, where the instructions are linked to operand tags designating operands required for the instruction execution and where the instructions are linked to destination tags indicating completion of an operation of the instruction; and the scheduling circuit issuing instructions to the EU for execution and operating to receive speculative issue requests from child instructions based on a matching of operand tags of the child instruction to destination tags of corresponding grandparent instructions and receive nonspeculative issue requests from child instructions based on a matching of operand tags of the child instruction to destination tags of parent instructions; and wherein the scheduling circuit selects among requests of different child instructions to prefer nonspeculative requests.

14. The computer architecture of claim 1 further including a set of instruction buffers holding instructions prior to execution including corresponding grandparent instructions, parent instructions, and child instructions where a given child instruction is data dependent on a corresponding given parent instruction and a given parent instruction is data dependent on a corresponding given grandparent instruction, where the instruction buffers are linked to operand tags designating operands required for the instruction execution and where the instructions are linked to destination tags indicating completion of an operation of the instruction; and wherein instruction buffers for child instructions hold at least one operand tag designating a destination tag of a grandparent instruction and at least one operand tag designating a destination tag of a parent instruction.

15. The computer architecture of claim 14 wherein the instruction buffers for child instructions hold only a single destination tag of a single grandparent instruction and only a single parent tag of a single parent instruction.

16. The computer architecture of claim 15 further including the scheduling circuit scheduling instructions of the circuit buffer for execution on EUs according to data dependencies and further including a predictor predicting a last of four grandparent instructions and a last of two parent instructions that will complete prior to a child instruction, the scheduling circuit scheduling the child instruction for execution when the single destination tag of the single grandparent instruction and the single parent tag of the single parent instruction matches the last of the four grandparent instructions and last of the two parent instructions.

17. The computer architecture of claim 1 wherein the computer architecture provides an out-of-order-processing of instructions.

* * * * *